(12) United States Patent
Barandiaran Salaberria

(10) Patent No.: US 6,886,671 B2
(45) Date of Patent: May 3, 2005

(54) GAS CYLINDER WITH A DOUBLE JACKET

(75) Inventor: Javier Barandiaran Salaberria, San Sebastian (ES)

(73) Assignee: Gain Gas Technique, S.L., Lezo (ES)

( * ) Notice: Subject to any disclaimer, the term of this patent is extended or adjusted under 35 U.S.C. 154(b) by 0 days.

(21) Appl. No.: 10/311,080

(22) PCT Filed: Mar. 22, 2002

(86) PCT No.: PCT/ES02/00147

§ 371 (c)(1),
(2), (4) Date: Mar. 31, 2004

(87) PCT Pub. No.: WO02/077497

PCT Pub. Date: Oct. 3, 2002

(65) Prior Publication Data

US 2004/0164468 A1 Aug. 26, 2004

(30) Foreign Application Priority Data

Mar. 23, 2001 (ES) .......................................... 200100685

(51) Int. Cl.⁷ ................................................. A47C 3/30

(52) U.S. Cl. ............................... 188/322.19; 267/64.11; 267/64.12; 248/347

(58) Field of Search ........................... 267/64.11–64.28, 267/113–129; 188/322.19, 322.16, 322.17, 322.18

(56) References Cited

U.S. PATENT DOCUMENTS

| | | |
|---|---|---|
| 4,844,392 A | 7/1989 | Bauer et al. |
| 5,516,082 A | 5/1996 | Barandiaran |
| 5,620,067 A | 4/1997 | Bauer et al. |

FOREIGN PATENT DOCUMENTS

| | | |
|---|---|---|
| EP | 0 804 889 | 11/1997 |
| ES | 2 204 193 | 2/1992 |
| ES | 1 035 096 | 3/1997 |

*Primary Examiner*—Matthew C. Graham
(74) *Attorney, Agent, or Firm*—Jacobson Holman PLLC

(57) ABSTRACT

A double liner gas cylinder with a straight-walled internal gas cylinder, housed inside a longer tube with an extend area housing outer bushing held in position by an outer tube.

3 Claims, 4 Drawing Sheets

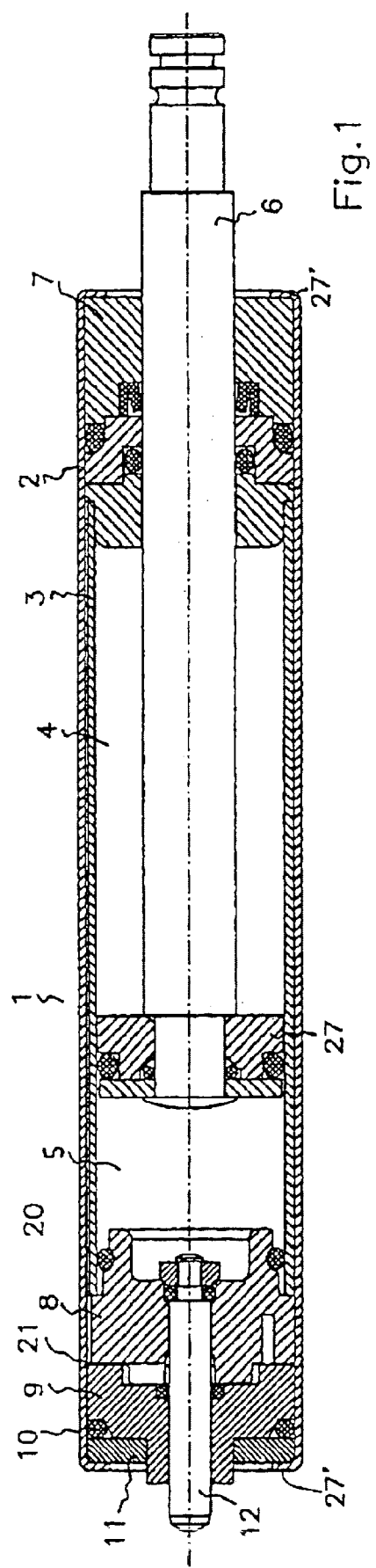
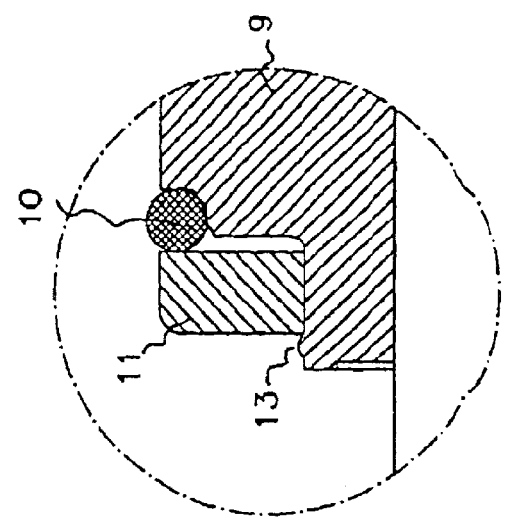
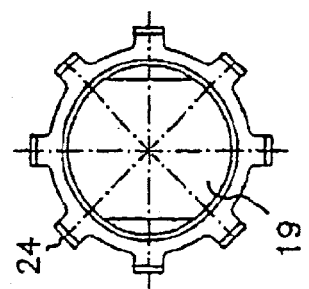
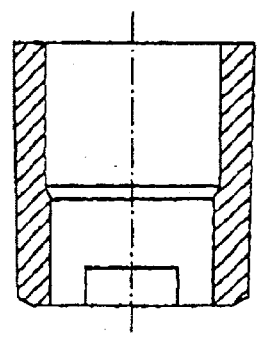

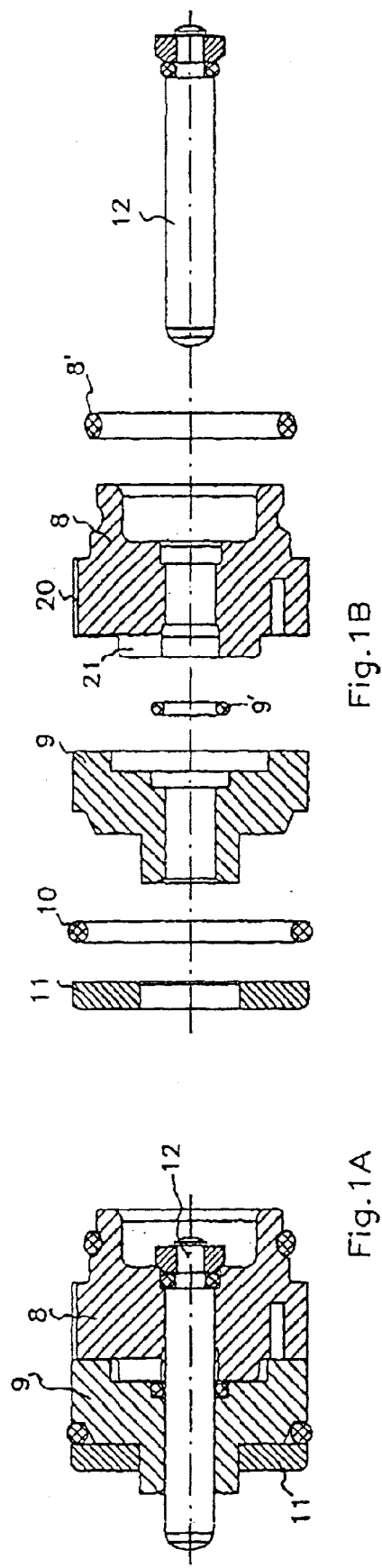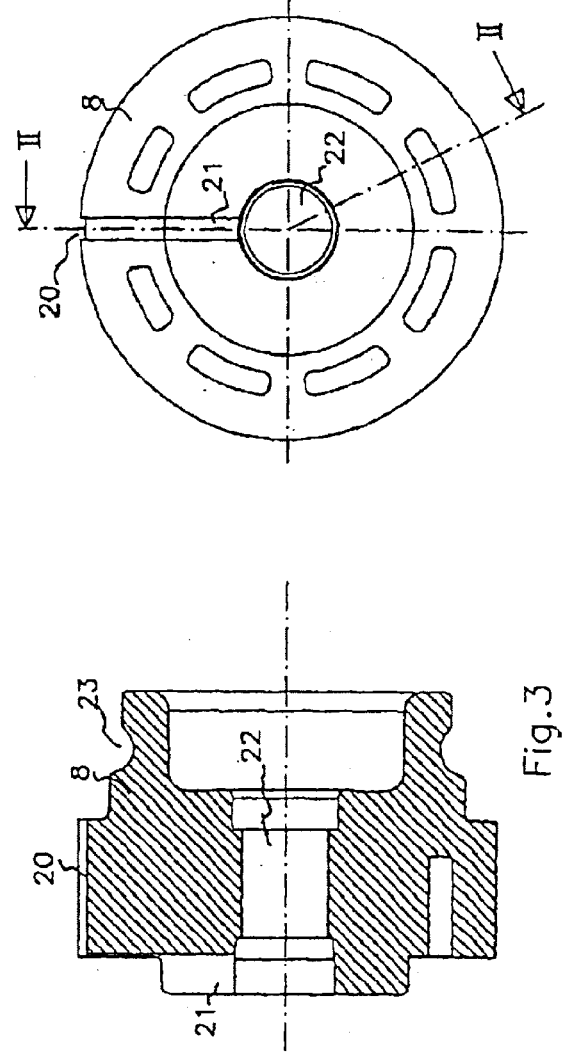
Fig. 1B
Fig. 4
Fig. 1A
Fig. 3

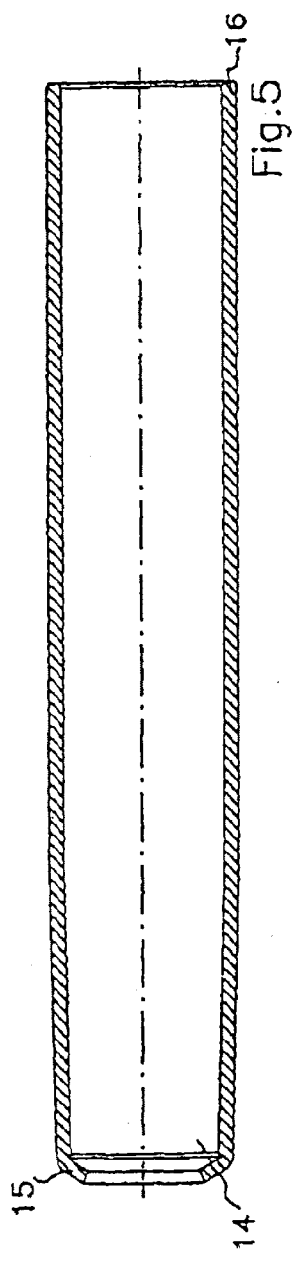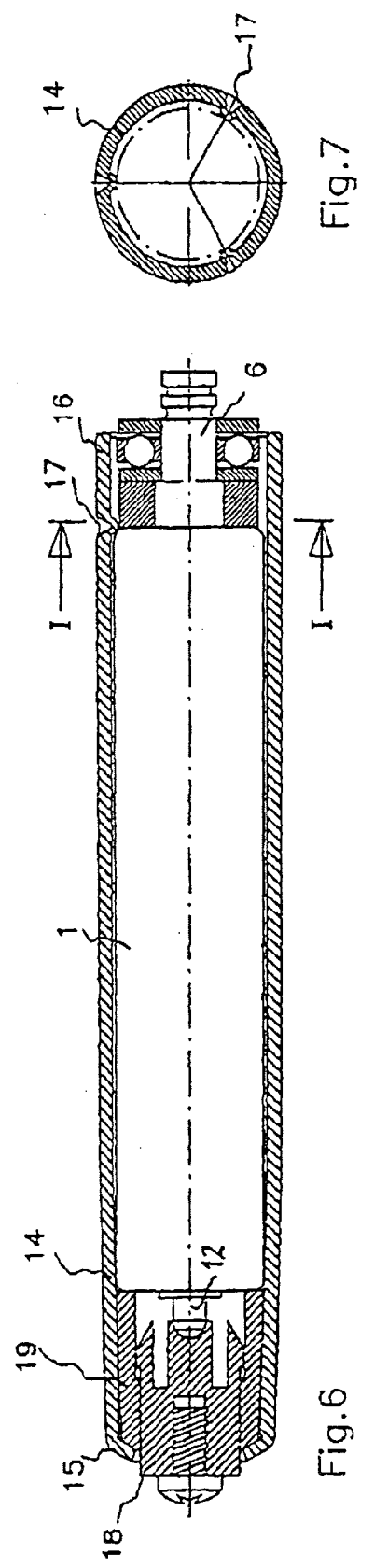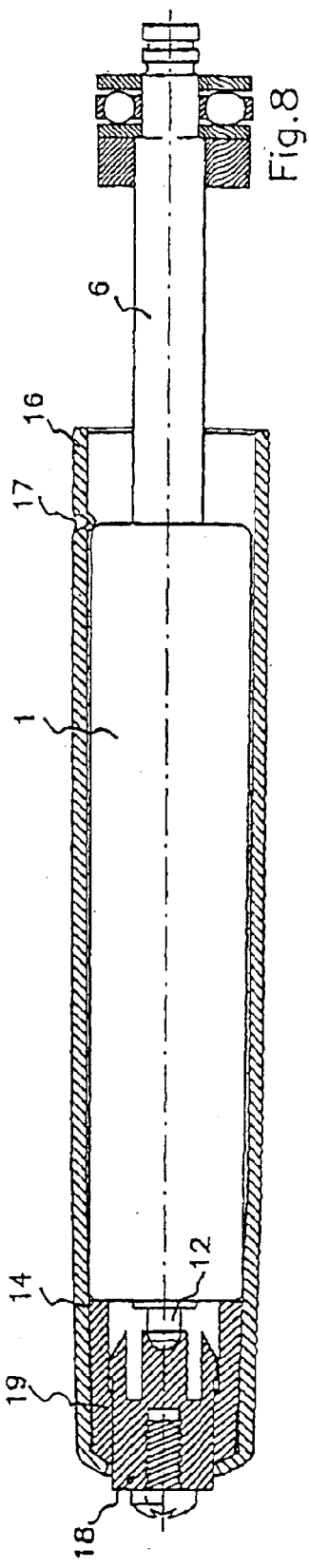

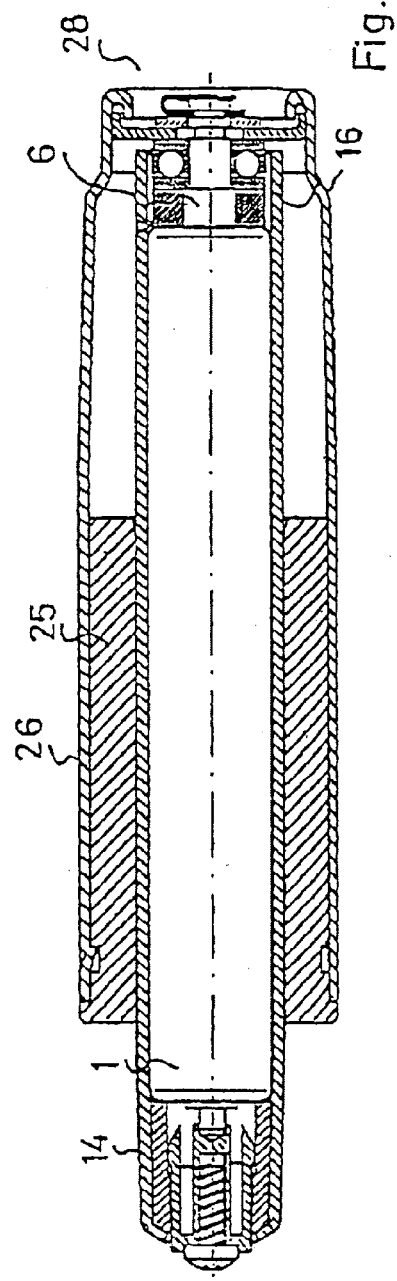
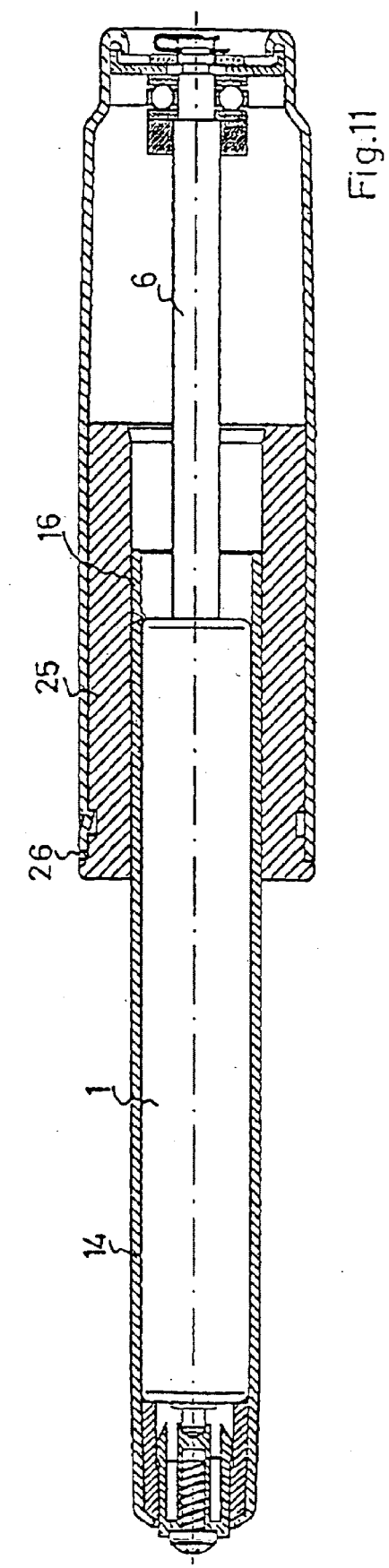

GAS CYLINDER WITH A DOUBLE JACKET

This is a nationalization of PCT/ES02/00147 filed Mar. 22, 2002 and published in Spanish.

FIELD OF THE INVENTION

The invention relates to a double liner gas cylinder that uses a conventional internal gas cylinder to increase surface contact with the column bushing and, as a consequence, with the unit's stroke end.

SUMMARY OF THE INVENTION

There are many double liner cylinders already on the market that work in the same way. What this invention offers, however, is new features in some of the components to improve the behaviour and performance of gas cylinders of this kind.

One of the developments of the original concept is the incorporation of an internal straight-walled gas cylinder, containing a valve cap and shaft cap which, although conventional in their design, incorporate new features.

The valve cap used here has only two components that are mechanically connected. The one located closer to the unit interior allows the gas to pass between chambers until it reaches an internal cavity surrounding the valve shaft. The component facilitates the passage of gas when the valve shaft is activated externally.

The other valve cap component, located on top of the other part helps it to form the cavity where the gas passes through. It is normally crowned with a ring seal, held in place by an outer washer.

In this part of the unit the unconnected ends of the straight-walled internal gas cylinder doubles back to connect with the valve and shaft caps and as a result, ensure that the different components are held firmly in position once they have been assembled.

Another feature of the new design is that the outer washer on the valve cap is held properly in place by a ring-shaped groove cut into the boss on the cap exterior.

The internal component of the valve cap is, like the external tube made of injected plastic. During manufacturing a ring-shaped groove is formed in the component to house the corresponding inner tube ring seal.

The gas cylinder is housed inside another tube with a tapered cone end that crowns the straight-walled cylinder. The straight part of this tube is longer than the gas cylinder which is fitted into it until it is comes up against the tapered cone end.

The gas cylinder is housed in the interior with the shaft output of the valve cap pointing out towards the tapered cone end. An external tube limiter is housed inside this tapered cone space and a pusher inserted into it. The end of the valve cap shaft is then fitted onto it.

The wall of the tube limiter is thin and has series of longitudinal ribs which increase the stiffness of the component and substantially reduce its weight. At the same time it also limits the entry of gas into the internal gas cylinder.

Grooves projecting inwards have been cut in the tube exterior in order to hold the gas cylinder in position. Where possible the grooves have been cut in sets of three with spaces of 120° between every two sets.

The space between the section where the grooves are cut and the unconnected end of the outer tube increases the length of the cylinder when the unit is operating.

The tube slides against a bushing. The bushing is sandwiched in between the inner and outer tubes. The outer tube is connected at one end to the boss on the bas cylinder shaft so that when the shaft is fully extended the bushing provides increased support and stability for the tube.

BRIEF DESCRIPTION OF THE DRAWING

These and other aspects can be seen in greater detail in the plans attached, details of which are given below:

FIG. 1: longitudinal cross section of gas cylinder.

FIG. 1A: valve cap in FIG. 1.

FIG. 1B: valve cap parts.

FIG. 2: magnified detail of the outer washer on the valve cap.

FIGS. 3 and 4: two views of the valve cap interior.

FIG. 5: tube encasing the gas cylinder.

FIG. 6: tube with gas cylinder housed inside, and with the cylinder shaft inserted.

FIG. 7: result of view I—I in FIG. 6.

FIG. 8: tube and cylinder with cylinder shaft extended.

FIG. 9: two views of the tube limiter.

FIG. 10: final assembly of the bushing and the outer tube with the cylinder shaft inside the cylinder.

FIG. 11: as FIG. 10 but with the cylinder shaft extended.

DETAILED DESCRIPTION OF THE PREFERRED EMBODIMENTS

FIGS. 1, 1A and 1B show the gas cylinder (1) with the concentric tubes (2 and 3). The outer tube (2) doubles (curves) back to encase, at both ends (27'), the shaft the shaft cap (7) and the valve cap (8, 9).

The outer tube is a straight-walled cylindrical part and the space inside is covered by the piston (27) linked to the cylinder shaft (6) to form two chambers (4 and 5) with a space between them. The gas passes from one chamber to the other through this space and through the airways in the shaft cap (7) and valve cap (8, 9) when the valve shaft (12) is pushed outwards.

FIG. 1B shows the ring seals (10, 9', 8') in detail.

FIG. 2 shows the washer (11) situated at the neck of the unit (9) and is held in place by the ring seal (10).

FIGS. 3 and 4 show the geometric configuration of the valve cap interior part (8) and the airway (20 and 21) allowing the gas to pass into the interior (22) of the part (8). Part (8) is made of injected plastic and incorporates the ring-shaped groove (23) to house the ring seal.

The tube (14) in FIG. 5 is a straight-walled cylinder almost all the way along until the left end (15) where it becomes a tapered cone. The gas cylinder (1) is housed inside the tube (14). The tube limiter (19) which contains the pusher (18) is fitted into the tube (14) beforehand.

At the valve shaft output (12) end the cylinder rests against the tube limiter (19) in a straight-walled cylindrical area. Part of the tube (16) is not covered by the cylinder and is unconnected in the unit extension.

The cylinder (1) is held in position inside the tube (1) by three grooves (17) that form internal bosses, as detailed in FIG. 7.

The end of the valve shaft (12) can be operated firm outside by the pusher (18), and the cylinder shaft (6) is designed to project outwards, as detailed in FIG. 8. The last parts to be connected are fitted to the free end of the shaft (6).

FIG. 9 shows the special configuration of the thin tube limiter (19), the wall of which is marked by a series of longitudinal ribs (24) which both strengthen it and make it lighter.

FIGS. 10 and 11 show the final assembly including the bushing (25) and the outer tube (26) encasing it. The bushing (25) runs along the outside of the tube (14) and connects with the cylinder shaft (6) at one end (28).

FIG. 11 shows the fully extended unit and how the outer tube end (16) provides the bushing (25) with extended seating and greater stroke, making the whole unit more stable.

What is claimed is:

1. Double liner gas cylinder comprising
an internal gas cylinder having a concentric outer tube and inner tube with a space for gas to pass between two internal cambers separated by a piston operating inside the inner tube, the gas cylinder being provided with a valve cap formed by two parts, a valve shaft, a shaft cap and a shaft linked to the piston and also having an outer bushing which surrounds the gas cylinder, the outer tube fits inside a longer straight walled tube, within said straight walled tube having a cylindrical portion also straight walled which is longer than the outer tube and is open at its ends, with the end formed as a tapered conical section, being the outer tube positioned by inserting the end of the valve shaft up to the start of said conical section and being the outer tube held in position by three grooves spaced at 120° from each other near the end where the end is a raised area that increases surface contact with the bushing when the shaft is fully extended, a tube limiter being housed inside a tapered conical action of the straight walled tube and, in turn, housing a pusher connected to a projecting end of the gas cylinder valve shaft, being the tube limiter provided with evenly-spaced ribs, the valve cap housed inside the outer tube being held in place by an outer washer that holds a ring seal in place, with the washer housed in a ring-shaped groove formed on the end of the valve cap.

2. Double liner gas cylinder in accordance with claim 1, wherein an inside part of the two parts of the valve cap is made of injected plastic and during the injection process a ring-shaped groove is formed where the part connects with the inner tube of the gas cylinder.

3. Double liner gas cylinder in accordance with claim 1, wherein the outer tube of the gas cylinder has curved ends with which the shaft cap and the washer on the valve cap make contact.

* * * * *